US009531636B2

(12) United States Patent
Li et al.

(10) Patent No.: US 9,531,636 B2
(45) Date of Patent: Dec. 27, 2016

(54) EXTENDING PROCESSING CAPACITY OF SERVER (75) Inventors: Li Li, Beijing (CN); Xin Hui Li, Beijing (CN); Wei Xue, Beijing (CN); Yi Xin Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 566 days.

(21) Appl. No.: 13/989,927

(22) PCT Filed: Nov. 24, 2011

(86) PCT No.: PCT/EP2011/070936
§ 371 (c)(1),
(2), (4) Date: Oct. 10, 2013

(87) PCT Pub. No.: WO2012/072486
PCT Pub. Date: Jun. 7, 2012

(65) Prior Publication Data
US 2014/0025828 A1 Jan. 23, 2014

(30) Foreign Application Priority Data
Nov. 29, 2010 (CN) .......................... 2010 1 0577023

(51) Int. Cl.
G06F 15/16 (2006.01)
H04L 12/911 (2013.01)
G06F 9/50 (2006.01)

(52) U.S. Cl.
CPC ............. H04L 47/70 (2013.01); G06F 9/505 (2013.01); G06F 2209/509 (2013.01); G06F 2209/5017 (2013.01)

(58) Field of Classification Search
CPC .. H04L 47/70; G06F 9/505; G06F 2209/5017; G06F 2209/509
See application file for complete search history.

(56) References Cited

U.S. PATENT DOCUMENTS 6,385,636 B1  5/2002  Suzuki
6,418,462 B1  7/2002  Xu
(Continued)

FOREIGN PATENT DOCUMENTS

EP  1234230 B1  9/2003
JP  2000242614 A  9/2000
(Continued)

OTHER PUBLICATIONS

Felician Alecu et al., "Cloud Computing Solutions", Economy Informatics, 2009, p. 104-111, v. 9, No. 1.
(Continued)

Primary Examiner — Moustafa M Meky
(74) Attorney, Agent, or Firm — Cantor Colburn LLP; David Quinn (57) ABSTRACT Embodiments of the present invention relate to a method and apparatus for extending processing capacity of a server side. In one embodiment, there is provided a method of extending processing capacity of the server side, comprising: deciding a job to be offloaded from the server side; partitioning the job into one or more tasks; allocating the one or more tasks to one or more clients in response to http requests transmitted from the one or more clients; receiving, from the http requests transmitted from the one or more clients, responses of the one or more clients to the from the server side one or more tasks.

16 Claims, 8 Drawing Sheets

(56) References Cited

U.S. PATENT DOCUMENTS

| | | | |
|---|---|---|---|
| 7,516,360 B2 * | 4/2009 | Bacher | G06F 11/2023 714/12 |
| 7,739,314 B2 | 6/2010 | Datar | |
| 7,797,368 B1 * | 9/2010 | Gadkari | G06F 9/5066 709/201 |
| 7,872,769 B2 * | 1/2011 | Akashi | G06F 3/1213 358/1.14 |
| 8,214,686 B2 * | 7/2012 | Ueda | G06F 9/4856 714/15 |
| 8,307,366 B2 * | 11/2012 | Lipton | G06F 9/5066 709/208 |
| 2002/0019844 A1 | 2/2002 | Kurowski | |
| 2005/0275881 A1 * | 12/2005 | Akashi | G06F 3/1213 358/1.15 |
| 2006/0080678 A1 | 4/2006 | Bailey | |
| 2008/0030764 A1 | 2/2008 | Zhu | |
| 2008/0301642 A1 * | 12/2008 | Alimi | G06F 9/5072 717/121 |
| 2009/0055370 A1 | 2/2009 | Dagum | |
| 2010/0042720 A1 | 2/2010 | Stienhan | |
| 2010/0125473 A1 | 5/2010 | Tung | |
| 2010/0223385 A1 | 9/2010 | Gulley | |
| 2010/0228819 A1 | 9/2010 | Wei | |

FOREIGN PATENT DOCUMENTS

| | | | |
|---|---|---|---|
| JP | 2003515807 A | | 5/2003 |
| JP | 2006244146 A | | 9/2006 |
| JP | 2008071294 A | | 3/2008 |
| TW | 200623713 | | 7/2006 |
| TW | 200703114 | | 1/2007 |
| TW | 201025065 A | | 7/2010 |
| WO | WO 01/14961 A2 | | 3/2001 |
| WO | WO 02/056192 A1 | | 7/2002 |
| WO | WO 2007/024498 A2 | | 3/2007 |

OTHER PUBLICATIONS

Selcuk K Candan et al., "Frontiers in Information and Software as Services", IEEE 25 Intl Conference on Data Engr., Mar. 29-Apr. 2, 2009, p. 1761-1768.

Korpela E et al., "Seti Home-Massively Distributed Computing for Seti", Computing in Sci and Engr, IEEE Serv. Center, Jan. 1, 2001, vol. 2, No. 1, p. 78-83, Los Alamitos, CA.

Herminder Singh et al., "Anal. of Security Issues and Performance Enhancement in Cloud Computing", Intl J of Info. Tech. and Knowl. Man., Jul.-Dec. 22010, p. 345-349, v. 2, N. 2.

* cited by examiner

Fig. 1A

Prior Art

Fig. 1B

Prior Art

EXTENDING PROCESSING CAPACITY OF SERVER

CROSS-REFERENCE TO RELATED APPLICATIONS

This application claims priority under 35 U.S.C. §371 from PCT Application PCT/EP2011/070936 filed on Nov. 24, 2011, which claims priority from Chinese Patent Application No. 201010577023.0 filed Nov. 29, 2010, the entire contents of both application are incorporated herein by reference.

FIELD OF THE INVENTION

The present invention relates to data processing, and more particularly relate to a method and apparatus for extending processing capacity of a server side, and a related computer program product.

BACKGROUND OF THE INVENTION

With the support of network technology and distributed computing technology, a data center comprising servers may be established, and an application requiring super large scale data processing capacity is executed through collaboration among a plurality of servers. However, for some computations, the computational operation cannot be completed purely dependent on the processing capacity of the server side. At this point, it is necessary to develop a new solution for extending or allocating the processing capacity of the server side.

In a large website with millions and even tens of millions of users, when mass users perform a query simultaneously or make index on some data in the website, hyper massive data processing capacity is always required. Now, a solution capable of extending the processing capacity of the server side is outlined using a shopping website as an example. As far as the server side of a shopping website is concerned, the servers may be partitioned into two types: Web application servers and analysis servers, with both types of servers sharing identical physical host resources. The Web application servers are typically used for running an application required for supporting a frontend Web service, while the analysis servers are typically used for providing other relevant data analysis functions.

Figure 1A:
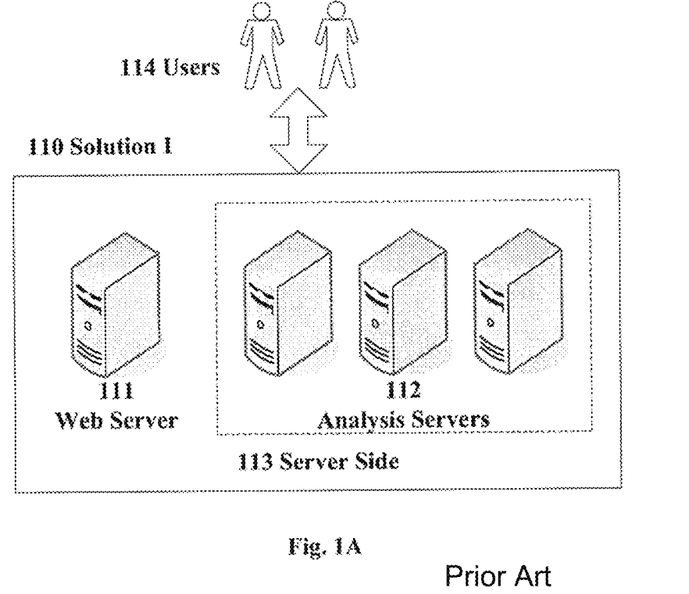
FIG. 1A schematically illustrates an architecture diagram of configuration at a server side according to a solution.

FIG. 1A schematically illustrates an architecture diagram of configuration at a server side 113 according to a solution. In solution 1110, when the number of users 114 is relatively small, a less number of servers may be allocated as Web servers 111, at which point more servers may be used as analysis servers 112. However, with the increase of users, the workload borne by the Web server side 113 might be multiplied and even increase exponentially. At this point, more hardware servers must be purchased as the Web servers 111, so as to provide more data processing capacity to adapt to increasingly high demands.

Figure 1B:
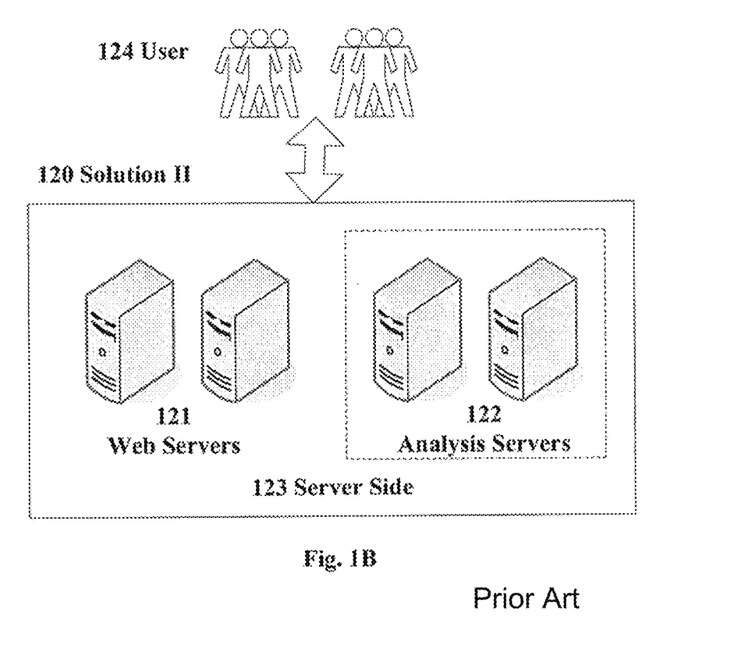
FIG. 1B schematically illustrates an architecture diagram of a solution for enhancing processing capacity of a server side.

FIG. 1B schematically illustrates an architecture diagram of a solution for enhancing processing capacity of the server side without increasing hardware investment. Solution II 120, when the number of users 124 is larger, may re-partition functionalities between respective servers at the server side 123. For example, it may assign more servers as Web servers 121, while assigning less servers as analysis servers 122.

SUMMARY OF THE INVENTION

Although the above solutions might solve the problem of resource shortage of the Web servers 121 to a certain extent, decreasing the number of the analysis servers 122 will cause various problems, such as deterioration of analysis capacity and an unduly long feedback time. Now, how to mobilize other available resources to enhance the processing capacity of the server side without increasing hardware investment on analysis server becomes an imminent problem.

Therefore, it is urgently desirable to provide a method so as to conveniently and reliably enhance the processing capacity of the server side without increasing the hardware investment; and it is further desirable to change the existing hardware and software configuration to the least and extend or re-allocate the processing capacity of the server side in an easily deployed manner.

According to one embodiment of the present invention, there is provided a method for extending processing capacity of a server side. The method comprises: deciding a job to be offloaded from the server side; partitioning the job into one or more tasks; allocating the one or more tasks to one or more clients in response to http requests transmitted from the one or more clients; receiving, from the http requests transmitted from the one or more clients, responses to the one or more tasks from the one or more clients.

According to another embodiment of the present invention, further comprised is selecting one or more clients to execute one or more tasks.

According to a further embodiment of the present invention, deciding a job to be offloaded from a server side comprises: determining a current load level at the server side; and appointing the job to be offloaded from the server side in response to deciding that the current load level will or already exceeds a threshold load level.

According to a still further embodiment, allocating the one or more tasks to one or more clients comprises: grouping the one or more clients based on attributes of the one or more clients; and assigning, with a unit of group, a task that matches the group to the one or more clients.

According to one embodiment of the present invention, there is provided an apparatus for extending processing capacity of a server side. The apparatus comprises: deciding means for deciding a job to be offloaded from the server side; partitioning means for partitioning the job into one or more tasks; allocating means for allocating the one or more tasks to one or more clients in response to http requests transmitted from the one or more clients; receiving means for receiving, from the http requests transmitted from the one or more clients, responses to the one or more tasks from the one or more clients.

According to one embodiment of the present invention, selecting means for selecting one or more clients to execute one or more tasks is further comprised.

According to one embodiment of the present invention, the deciding means comprises: determining means for determining a current load level at the server side; and appointing means for appointing the job to be offloaded from the server side in response to determining that the current load level will or already exceeds a threshold load level.

According to one embodiment of the present invention, the allocating means comprises grouping means for grouping the one or more clients based on attributes of the one or more clients; and assigning means for assigning, with a unit of group, a task that matches the group to the one or more clients.

By using the various embodiments of the present invention, it is possible to conveniently and reliably enhance the processing capacity of the server side without increasing hardware investment and to extend or re-allocate the processing capacity of the server side in an easily deployed manner.

BRIEF DESCRIPTION OF THE DRAWINGS

Features, advantages, and other aspects of various embodiments of the present invention will become more apparent through the following detailed description with reference to the following drawings, wherein:

FIGS. 5A and 5B schematically illustrate a flowchart of processing at a server side according to one embodiment of the present invention, respectively, wherein

FIGS. 6A to 6D schematically illustrate detailed operations in the processing flow of FIG. 5B, wherein

DETAILED DESCRIPTION OF EMBODIMENTS

The flowcharts and block in the figures illustrate the system, methods, as well as architecture, functions and operations executable by a computer program product according to the embodiments of the present invention. In this regard, each block in the flowcharts or block may represent a module, a program segment, or a part of code, which contains one or more executable instructions for performing specified logic functions. It should be noted that, in some alternative implementations, the functions noted in the blocks may also occur in a sequence different from what is noted in the drawings. For example, two blocks as illustrated consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

Hereinafter, a processing flow of a method according to an exemplary embodiment of the present invention will be described in detail only using a shopping website as an example. It should be noted that according to one embodiment of the present invention, implementation of various methods, apparatuses and computer program products is not limited in a Web-based application represented by a shopping website, implementation of which may also be performed in various kinds of other applications.

A client may access a server side in various manners, and herein, only connection to the server side in a manner of accessing a Web page provided by the server side is taken as an example, while a computing device at a client side may also access the server side via a network through other applications. For example, the server side may be accessed through a particular application or by installing a plug-in.

It should be further noted that although a common computer terminal is taken as a specific example of a client herein, and a common computer terminal accessing the server side in a Web manner is taken as a specific example, it would be appreciated that the client may further comprise various kinds of computing terminals having data processing capacity, such as a desktop computer, a laptop computer, a panel computer, and a work station, etc. With the miniature trend of computing devices and enhancement of processing capacity, the client may further comprise a portable mobile computing device such as a personal digital assistant, an intelligent phone, and a mobile terminal.

It should be noted that although an analysis server in a shopping website is taken as an example in the embodiments of the present invention, the embodiments of the present invention are not limited to this example but may comprise any server capable of partitioning a job running thereon into a plurality of tasks executed on a plurality of computing terminals. It should be noted that the job partitioning as mentioned herein needs to consider various factors such as the urgent degree of the job, its real-time nature, and confidential nature, etc.; and not all jobs are suitable to be executed on a client connected to the server side. By using the method of the present invention, a plurality of clients connected to the server side may share tasks that were originally planned to be executed at the server side, and further the workload at the server side is alleviated.

According to one embodiment of the present invention, an advantage lies in extending the processing capacity of the server side in a manner transparent to the client. For example, it is unnecessary for the user to install a dedicated application for receiving an allocated task and returning a processing result, while the server side may allocate a task thereto in response to http requests transmitted from the client, and it is only necessary for the server to receive a response to the task from the request transmitted from the client. Besides, it is unnecessary for the client to install a dedicated application for executing the task, and the allocated task may be implemented in a task description manner, where the client can implement the allocated task only based on the task description.

Figure 2:
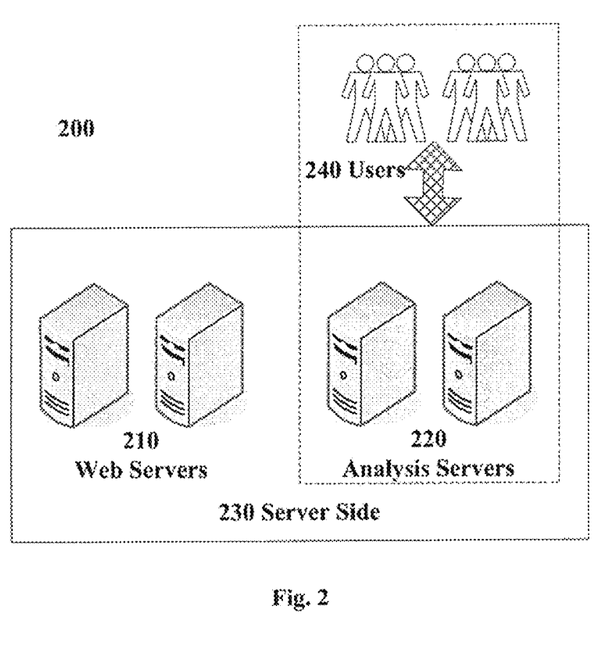
FIG. 2 schematically illustrates an architecture diagram of extending or allocating processing capacity of a server side according to one embodiment of the present invention.

FIG. 2 schematically illustrates an architecture diagram 200 of extending or allocating processing capacity of a server side according to one embodiment of the present invention. The server side can include web servers 210 and analysis servers 22. According to one embodiment of the present invention, when resources at the server side (for example, an analysis server 220) are short, the processing capacity of the clients connected to the analysis server 220 may be collaboratively utilized to improve the overall data processing capacity of the server side.

Unlike the solution as illustrated in FIGS. 1A and 1B, in the embodiment as illustrated in FIG. 2, the interaction between the client used by a user 240 and the analysis server 220 is not limited to conventional operations that the client requests data and receives data from the analysis server 220;

the client may further receive a task allocated by the analysis server 220 and relevant to-be-processed data, and after processing the relevant to-be-processed data based on task description, return the processing result to the analysis server 220. At this point, the server side allocates the tasks and relevant to-be-processed data to qualified clients through partitioning its own job into tasks of suitable size, and receives the processing result from the clients, so that the clients of user 240 share part of the job which was originally planned to be executed by the analysis server 220 itself.

Figure 3:
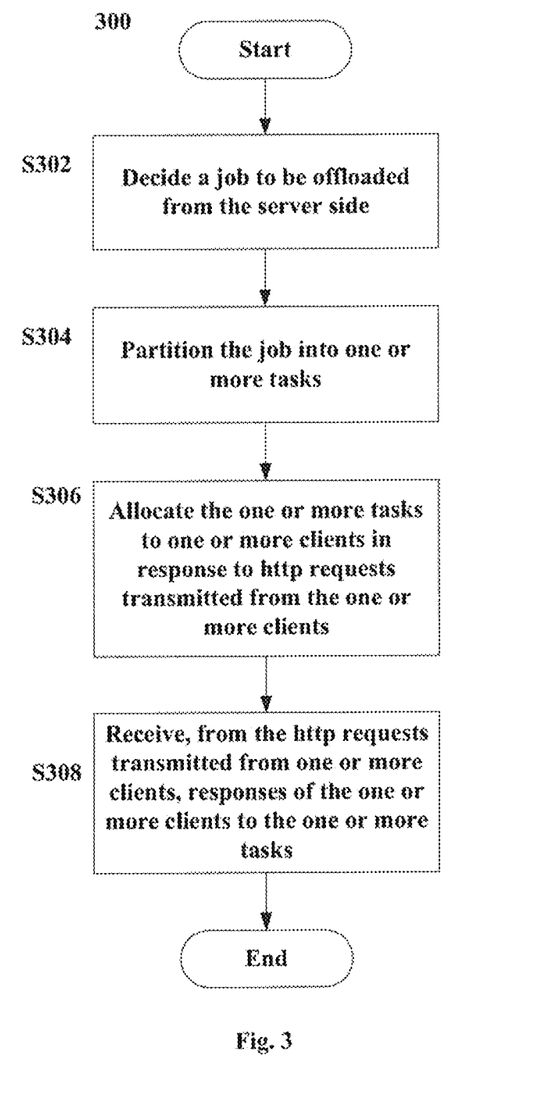
FIG. 3 schematically illustrates a flowchart of a method for extending or allocating processing capacity of a server side according to one embodiment of the present invention.

Hereinafter, a work flow of a method and system architecture according to one embodiment of the present invention will be described with reference to FIGS. 3 to 7. FIG. 3 schematically illustrates a flowchart 300 of a method for extending or allocating processing capacity of a server side according to one embodiment of the present invention. As illustrated in FIG. 3, according to one embodiment of the present invention, the method for extending or allocating the processing capacity of the server side starts from step S302. At step S302, a job to be offloaded from the server is first decided. It should be noted that, the "offload" operation here generally refers to a process of re-assigning a job which should originally be executed by a computing device at the server side to other computing device for execution. The offloaded job may be a new job which has just been allocated to the server side but not executed yet, or a job which is being executed but has to be shared by other computing device because the server side has an overwhelmingly heavy load. It should be noted that when deciding a job to be offloaded, factors such as current load at the server side, processing capacity of the server side, confidentiality of the job, and response time of the job may be considered. For example, it may be considered to execute in priority a job which has a high confidentiality and requires an utmost real-time response at the server side, and it may be selected to offload a job which has a low confidentiality and a low requirement on response time, for the client to execute.

At step S304, the job decided at step S302 is partitioned into one or more tasks. It should be noted that according to one embodiment of the present invention, the server side may partition the job based on a predefined rule. For example, during partitioning, granularity of tasks may be determined, and the to-be-processed data corresponding to the tasks may be determined, etc. It should be noted that based on factors such as the computing capacity of the clients and the network connection state between the clients and the server side, the tasks allocated to the clients generally have a finer granularity and it is required to adopt a redundant mechanism (for example, allocating a same task to a plurality of clients) so as to ensure that the server side may receive a response from at least one clients, etc. According to one embodiment, when partitioning a job, each task may have a different granularity, and the to-be-processed data corresponding to each task may also have a different size.

At step S306, in response to http requests transmitted from the clients, one ore more tasks are allocated to the one or more clients. It should be noted that a different allocation policy may be set. For example, it is possible to limit that one client can execute only one task at the same time, and a next task can only be obtained till the task has been completed and a task execution result has been submitted to the server; or it is possible to limit that one client may execute a plurality of tasks from the same job simultaneously, or a client may execute a plurality of tasks from different jobs, etc. It should be noted that task allocation is performed in response to http requests transmitted from the client. For example, when the server side detects logon of a client, it may perform the task allocation operation. According to one embodiment, as long as the client maintains connection to the server side after a logon, tasks may be allocated to the client. After the client has completed a task, the server side may further allocate other one or more tasks to the client or will not allocate a task to the client any more, based on the policy of the server side itself. When the client disconnects its connection with the server side (for example, closing a Web page), then the server side will not allocate a task to the client any more. Further, the client may also receive a plurality of tasks from servers in different data centers.

Next, at step S308, from one or more http requests transmitted from one or more clients, responses of the one or more clients to the one or more tasks are received. According to one embodiment of the present invention, there further comprises processing an exception situation that the client has no response. At steps S306 and S308, task allocation and reception of response of a client to the task are both implemented in a manner of http request, without changing the existing configuration of the clients.

According to one embodiment of the present invention, there further comprises: selecting one or more clients of the server side (for example, at the data center) for executing one or more tasks. It should be understood that a situation that millions of clients are connected to the server side might exist, thus the objective of this selecting step is to select clients suitable for executing the task from available clients, so as to complete this task more timely and accurately. The attributes of the clients may be used as filter standards to select clients suitable for executing the task. In one embodiment, clients with higher hardware configuration, lighter workload, and better network connection condition may be selected, or selection may be performed randomly, or all clients that are currently accessing the server may be used, etc.

According to one embodiment of the present invention, deciding a job to be offloaded from a server side comprises: determining a current load level at the server side; and appointing the job to be offloaded from the server side in response to determining that the current load level will or already exceeds a threshold load level.

According to one embodiment of the present invention, when deciding a job which is required to be offloaded, the server side may first check its own current workload. If the current load at the server side is relatively small, then a new job may be completely executed at the server side; if the current load of the server side has approximated the full load, then a portion of the job may be assigned to the host at the server side for execution, and the remaining portion is assigned to the clients, or the whole job may be allocated to the clients for execution; further, during the job execution process, if the server side has found that the current load level approaches to or has already exceeded a threshold load level, the job which is being executed at the serve end may be removed from the server to be further partitioned, and then clients are assigned to execute the removed portion which has not been completed at the server side in the job. According to one embodiment of the present invention, the offloaded job is subsequently partitioned into one or more tasks for execution at one or more clients. Hereinafter, a flow of performing load check at the server side will be described in detail with reference to FIG. 5A.

Figure 4:
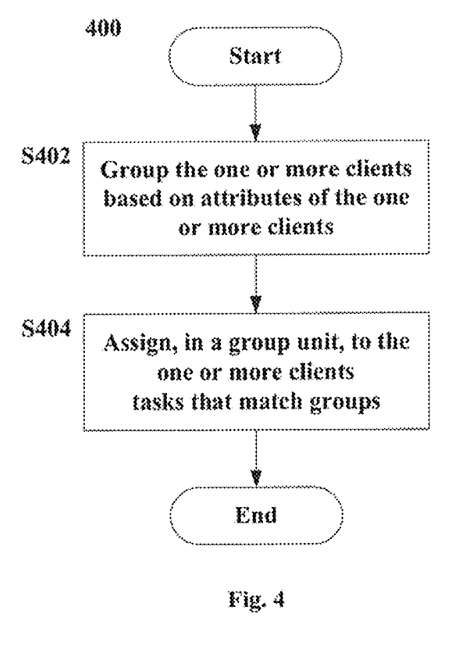
FIG. 4 schematically illustrates a flowchart of a method for allocating tasks to clients of a server side according to one embodiment of the present invention.

Now referring to FIG. 4, it schematically illustrates a flowchart 400 of a method for allocating tasks to clients of a server side according to one embodiment of the present invention. At step S402, one or more clients are grouped based on the attributes of the one or more clients. The grouping may consider the common nature of the clients connected to the server side, where clients with identical attributes are grouped in a corresponding group, and when allocating tasks, tasks which are more suitable for execution by the clients in the group may be selected.

Attributes of the clients may comprise one or more of: processing capacity of the clients, current loads of the clients, response time of the clients, confidence degree of the clients, routing condition from the clients to the server side, history of task completion of the clients, and agreements between the clients and the server side, etc.

An idea of the embodiments of the present invention is to collaboratively utilize the processing capacities of the clients. This collaboration manner may be transparent to the user, namely without much manual participation from the users or modifying the application of the clients. For example, processing capacity share agreements may be pre-signed between the server side and the clients, namely it is pre-agreed that the server side may allocate a task to the clients, and the clients promise to execute the task and return the processing result to the server side. After the clients agree with the agreements, it may accept the task allocated from the server side and perform subsequent operations. According to different business operation models, collaboratively sharing the processing capacities of the clients may also be implemented in other manner, but business models and legal issues involved in the operation process will not be detailed here.

With a unit of group, a task that matches the group may be assigned to one or more clients. For example, clients with stronger processing capacity are set into one group, and thus tasks requiring higher processing capacity may be allocated to the clients in the group. For example, they may be allocated with a task having a high computational power and a heavy computational load, or they may be allocated with a to-be-processed data block with a larger size. For another example, if it is known from the past experience that the response time of some clients is very short, then these clients may be classified into one group, and a task with a higher demand on response time may be allocated to this group. For further example, if a history of job completion of some clients illustrates that their completion rates for previous tasks are quite high, then these clients may be classified into one group, and tasks are allocated in priority to this group. The clients may be partitioned into different groups based on different service agreements between the server side and the clients. For example, if the clients agree to contribute their own computing capacity at night (for example, 00:00-06:00) and guarantee that they are connected to the server side during this time period, then the server side may partition clients with similar situation into the same group and allocate tasks to the clients in this group continuously at night.

According to one embodiment of the present invention, allocating the one or more tasks to one or more clients comprises: responsive to logon of one or more clients to the server side, sending a task description corresponding to the one or more tasks and to-be-processed data to the one or more clients. It should be noted that allocating tasks to clients is conditioned with the clients connecting to the server side. According to one embodiment, for example, a task may be allocated to a client when it is accessing a page of the server side, and during the time period when the client maintains connection to the server side, the server side may leverage the processing capacity of the client, while after the client leaves the page, the processing capacity of the client cannot be leveraged. It should be noted that according to one embodiment of the present invention, the client may access the server side in a Web-based manner. The Web manner here should be given a broad explanation. This manner includes, but not limited to, a Web page provided by accessing the server side, and may further include various kinds of Web-based access manners which have already existed and will be developed in the future. According to service agreements, a task may be allocated to the clients during the period when the clients log onto the server side.

An advantage of one embodiment of the present invention is that the computing capacity of the clients may be leveraged without additionally installing a new application on the client, because during allocating the task, a task description corresponding to the task is sent while the to-be-processed data are sent to the clients. Thus, the clients may process the to-be-processed data with the received task description. The task description may comprise one or more items of: an input data description, an output data description, and a processing algorithm, or may comprise a processing algorithm description.

For example, in a scenario that a log of a shopping website only takes down records of each piece of transaction (for example, how many commodities are sold at a certain time, and how much the unit price of the commodities is), suppose a job is intended to calculate the amount of the biggest single transaction and the name of the corresponding commodity, then this job may be partitioned as follows:

Suppose the log has taken down 10,000 pieces of transaction records, then for example, the records are partitioned into 1,000 data segments, and the task of calculating the amount of the biggest single transaction in a data segment is allocated to each client (in the case of having set a client group, the task may also be allocated to the client group). At this point, a task description and corresponding to-be-processed data are sent to the clients (or client groups). Without considering the client group, the server side may send the task to 1,000 clients, while each piece of to-be-processed data may be a data segment including 10 pieces of transaction records. Considering factors such as the confidence degree of the clients and network condition, other allocation manner capable of enhancing confidence degree may be also adopted, a specific example of which will be described in detail.

According to one embodiment of the present invention, a task description may be:

{input data: log data including 10 pieces of transaction records, wherein each piece of data records includes: commodity name: a; quantities of sold commodity: b, and unit price of the commodity: c;

output data: biggest single transaction amount, commodity name;

algorithm: biggest single transaction amount=b×c, commodity name=a}

Each client having received the task description may adopt the above algorithm to calculate the processing result for the 10 pieces of transaction records. This algorithm may be described with a script technology (for example, AJAX technology) or with other program which may be executed directly or indirectly by the clients. When the server side receives the processing result returned from the 1,000 clients, for example, two-tuples (biggest single transaction amount, commodity name), it is only required to select a two-tuple having "biggest single transaction amount" from the 1,000 two-tuples, without comparing the data in the 10,000 pieces of records log one by one.

According to one embodiment of the present invention, partitioning a job into one or more tasks is performed based on a predetermined rule which relates to at least one of: granularity of the task, computational load of the job, priority of the job, confidentiality of the job, etc. For example, when the computational load of the job is heavy, the job may be partitioned into more tasks with a relatively light computational load, such that the clients may complete each task in a relatively short time and return the processing results to the server side as soon as possible. For example, it may be considered to process in priority a job with top priority, and then after partitioning, the corresponding tasks are allocated to clients that have a high processing capacity and a quick response time and that are more creditable. For example, based on the confidentiality of a job, the job with higher confidentiality may be partitioned into a less number of tasks to be allocated to more creditable clients for execution, so as to reduce the risk of being trespassed during the task allocation and result recovery processes.

It should be noted that the granularity of tasks may be dynamically set based on experience of the clients in previous task execution. For example, during the previous process of executing tasks, if a great number of clients fail to figure out the processing results within a predetermined response time because of an over large task granularity, and then a finer task granularity may be set subsequently, and vice versa. It should be noted that attributes of the clients may be further considered when setting the task granularities. For a job, a plurality of task granularities may be set during partitioning. Namely, the job may be partitioned into a plurality of tasks with different sizes so as to allocate corresponding tasks to different clients and/or client groups.

According to one embodiment of the present invention, there may further comprise: generating a processing result of at least one part of a job based on responses of one or more clients to one or more tasks. Here, the process of generating a processing result of at least one part of a job refers to aggregating responses from a plurality of clients to obtain the processing result. For example, during calculating the biggest single transaction amount and the corresponding commodity name of a shopping website, the server side receives the processing results from 1,000 clients, for example, a process of selecting a two-tuple with "the biggest single transaction amount" after receiving the 1,000 two-tuples (biggest single transaction amount, commodity name).

Additionally, when only offloading part of a job from the server side (for example, calculating by the server side the "biggest single transaction amount" in the 5,000 pieces of log records, while the clients process another 5,000 pieces of log records), if the task partitioning manner does not change, then the server side is only required to generate a processing result of at least one part of the job (namely, for the 5,000 pieces of log records) based on responses from 500 clients (namely, 500 two-tuples).

According to one embodiment of the present invention, generating a processing result of at least one part of a job further comprises: obtaining confidence degree of responses from one or more clients; and providing a processing result of at least one part of the job based on the confidence degree. The principle about how to guarantee the confidence degree of the final result has been briefly introduced above, and now a specific operation flow will be described in detail.

Since an idea of the embodiments of the present invention is to collaboratively leverage the processing capacities of clients, while the clients are always connected to the server side via the Internet, the clients accepting the tasks allocated from the server side may constantly change. At this point, the confidence degree of the final processing result of the job can only be guaranteed by guaranteeing the confidence degree of the processing results from respective clients.

Confidence degree of responses from the clients may be estimated in a manner of determining consistency. For example, a task and its corresponding processing data may be sent to a plurality of clients so as to guarantee that at least one client may return the processing results; processing results from a plurality of clients for a same task and corresponding to-be-processed data may be comprehensively compared, for example, analyzing the consistency of the plurality of processing results, and selecting a processing result consistent with the plurality of processing results; a task may be allocated to a client group; allocating a same task to a plurality of client groups, comparing the consistency of the processing results from the plurality of groups, and selecting a processing result with a relatively high consistency. According to one embodiment of the present invention, a method of, for example, "averaging" a plurality of processing results may be further employed. It should be noted that the "averaging" here is not a simple mathematic mean value resolution, but a process of obtaining the most creditable result based on the processing results from a plurality of clients.

For another example, when generating a processing result of at least one part of a job by using the responses from the clients, if the final processing result is inconsistent with historical empirical value, against an existing standard, or against a common sense, these responses from the clients may be discarded. Tasks are re-allocated based on the processing capacity of the server side itself or by selecting more creditable clients. It should be noted that according to one embodiment of the present invention, all operations of allocating a task to the clients are also suitable for allocating a task to the client group. According to one embodiment of the present invention, a job may be further partitioned into different sets of tasks according to different granularity degrees, and the obtained sets of tasks are allocated to different client groups for processing, and processing results from respective groups are compared to determine the confidence degree.

A method for allocating tasks to clients of the server side according to one embodiment of the present invention has been described above with reference to FIGS. 2 to 4. Now, details of performing processing at the server side according to the method of the present invention will be described with reference to FIGS. 5A and 5B and FIGS. 6A to 6D.

Figure 5A:
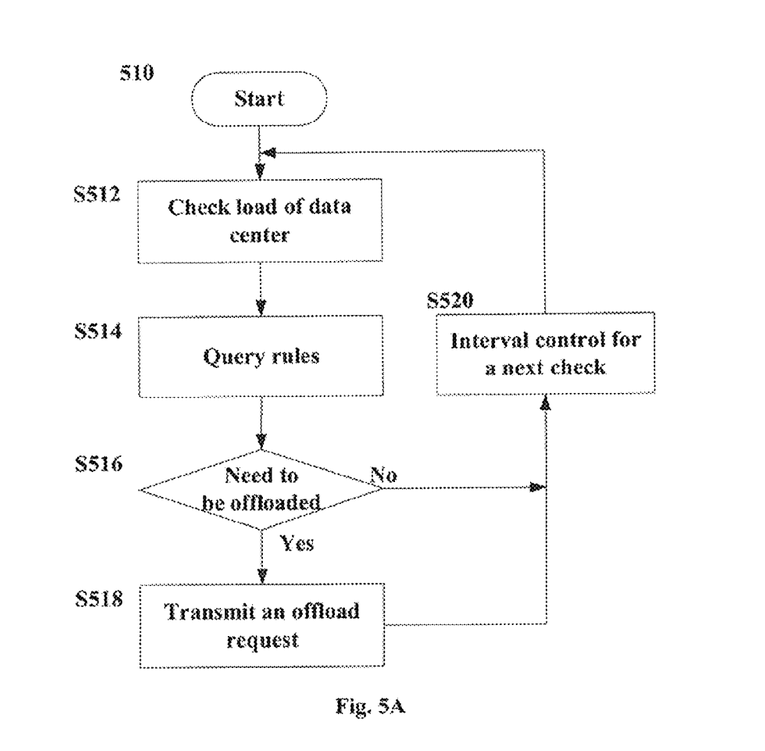
FIG. 5A illustrates a workload check flow at the server side.
Figure 5B:
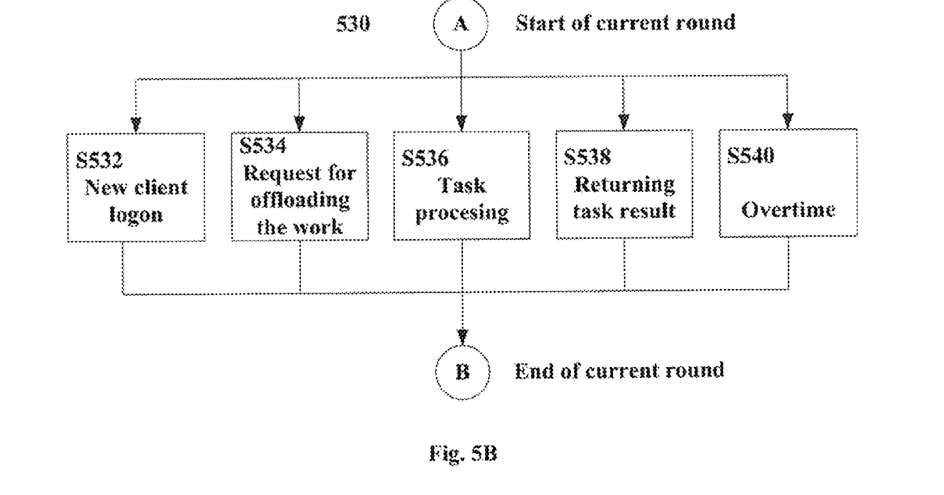
FIG. 5B illustrates an event processing flow at the server side.

FIGS. 5A and 5B schematically illustrate a flowchart of processing at a server side according to one embodiment of the present invention. As illustrated in FIG. 5A, FIG. 5A illustrates a load check flow 510 at the server side. According to one embodiment of the present invention, it is required to check a current load at the server side in a predetermined time interval so as to guarantee that when the server has an overwhelmingly high load, a part of job may be "offloaded" therefrom and to be executed by the clients. As illustrated in flow 510, at step S512, a current load at the server side is checked; and then a rule is queried at step S514. It should be noted that the rule here may be a predefined rule, for example, setting conditions required for offloading a job from the server side, such as load threshold for the server side processing capacity, which job may be offloaded in priority, which job is unsuitable for being offloaded, etc. Additionally, this rule may further vary dynamically with the job completion state at the server side or may be set empirically by an administrator.

At step S516, whether it is necessary to offload a job from the server is determined; if it is necessary to offload the job, then the process proceeds to step S518 so as to issue an offload request; if it is unnecessary to offload the job, then the process proceeds to step S520. The step S520 controls the interval for next check. For example, an interval control timer may be set, and when the timer expires, repeating the operation S512 for performing a next round of load check. After performing step S518, the flow turns to step S520 to wait for the next check. It should be noted that steps S512 to S520 is a process of repetitive execution. As long as the server side is in a running state, then this process is executed, so as to determine whether it is necessary to leverage the processing capacity of the clients based on the current load of the server side.

Now, referring to FIG. 5B, this figure illustrates an event processing flow 530 at the server side. It should be noted that like the load check process in FIG. 5A, the event processing flow 530 is also an operation repetitively executed during the running period of the server side. For the sake of illustration, symbol "A" is taken as a start point of each round of event processing, while symbol "B" is taken as an end point of each round of event processing. All the five steps as illustrated in FIG. 5B start from the start point "A" and end at the end point "B," but it does not mean that the 5 steps should be performed strictly in parallel in each round, but that they may be executed in different time intervals responsive to occurrence of corresponding events, and it does not exclude the circumstances that two or more steps are executed simultaneously.

As illustrated in FIG. 5B, during the running process, the server side has to process the following events: S532 new client logging on, S534 requesting to offload a job, S536 task processing, S538 returning a task result, and S540 timeout. It should be noted that as far as a round of processing is concerned, during the process from S534 requesting to offload a job to S538 returning a task result, steps S534 to S538 may be executed in sequence. However, for different rounds, execution of steps S534 to S538 does not necessarily have sequential relationship, and they do not need to be executed exactly in parallel. For example, while performing S534 requesting to offload a job, S536 task processing of another job may be performed, or S538 returning a task result for a further task may be performed.

It should be noted that the S540 timeout step as illustrated is processing for a scenario in which the server has allocated a task to the clients but fails to receive expected returned results within a prescribed time period. When the server side detects occurrence of a timeout event, the processing may comprise: 1) updating the statistics on the task completion states. Because the tasks in a timeout condition are not completed, it is required to mark the timeout task as "unfinished," i.e., updating the completion state of respective tasks. 2) adding a task into a task list. For "uncompleted" tasks, it is necessary to re-allocate them to the clients for processing. At this point, the reallocation is similar to the processing in step S536 task processing, which will be described in detail hereinafter; 3) marking available groups. After timeout, the group whose execution of a task ends with timeout is in an idle state, thus this group may be marked as "available," so as to execute other allocated tasks.

Hereinafter, a processing flow for other events will be illustrated with reference to FIGS. 6A to 6D, wherein symbols "A" and "B" correspond to a start point and an end point of each round of event processing as illustrated in FIG. 5B, respectively.

Figure 6A:
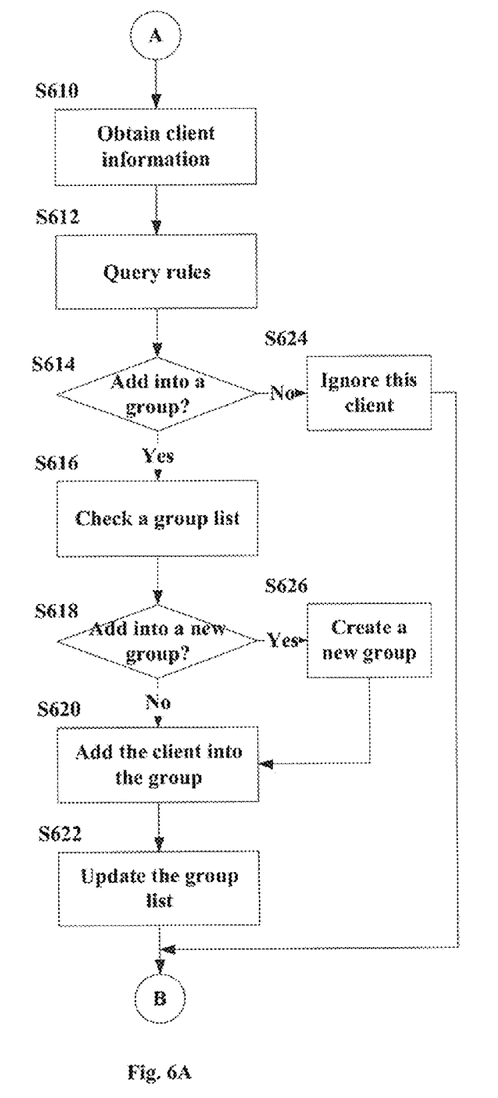
FIG. 6A illustrates a processing flow for logon of a new client.

As illustrated in FIG. 6A, this figure illustrates details of a processing flow S532 of new client logon as illustrated in FIG. 5B. In this round of operation, responsive to occurrence of a new client logon event, at step S610, information on the client is first obtained. For example, this information may be attributes of the client, such as processing capacity of the client, current load of the client, response time of the client, confidence degree of the client, the routing condition from the client to the server side, task completion history of the client, and agreements between the client and the server side, or other information associated with the newly logging client. Next, a rule is queried at step S612. The rule here is a rule for grouping clients. For example, in the case that a group for a particular type of clients has already exists, the rule may be a rule about adding clients with what attributes into the group.

At step S614, whether to add the client into the client group is determined. If it is unnecessary to add it into the client group, then the flow proceeds to step S624 and neglects this client. This round of a new client logon event processing ends, and the operation flow continues to wait for other event. If the determination at step S614 is "Yes," then the flow proceeds to step S616 to check the group list. Next, during operating S618, whether to add the client into a new group is determined; if the determination is "yes," then the flow proceeds to step S626 to create a new group; otherwise, the flow proceeds to step S620 to add the client into an existing client group. Next, at step S622, the client group list is updated, and this round of event processing ends. It should be noted that according to one embodiment of the present invention, the above creating a new group and adding the client into the existing group are performed based on the client information and rule obtained at step S610 and step S612.

Figure 6B:
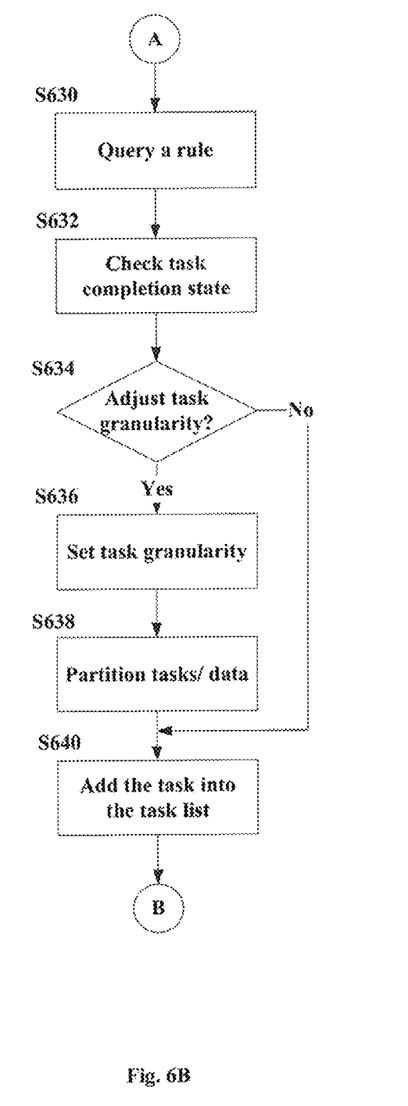
FIG. 6B illustrates a processing flow of returning a task result.

As illustrated in FIG. 6B, this figure illustrates details of a processing flow S534 of requesting to offload a job as illustrated in FIG. 5B. During this round of operation, responsive to occurrence of an event of requesting to offload a job, at step S630, a rule is queried, where the rule specifies which type of job may be offloaded, which type of job may not be offloaded, and priority sequence when a plurality of offloadable jobs exist simultaneously, etc. Next, at step S632, completion state of a job is checked, and at step S634, whether it is necessary to adjust granularity of tasks is determined, where if it is unnecessary to adjust, then the operation proceeds to step S640 to add the tasks into a task list; and if it is necessary to adjust, then the operation proceeds to step S636 to re-set the granularity of the tasks. According to one embodiment of the present invention, the granularity of tasks may be set dynamically based on experience of a client in previous task execution. Then, at step S640, the task is added into the task list to be scheduled by the task processing process S536 as illustrated in FIG. 5B. At this point, the processing for the event of requesting to offload a job ends, and the process enters into the state of waiting for other events.

Figure 6C:
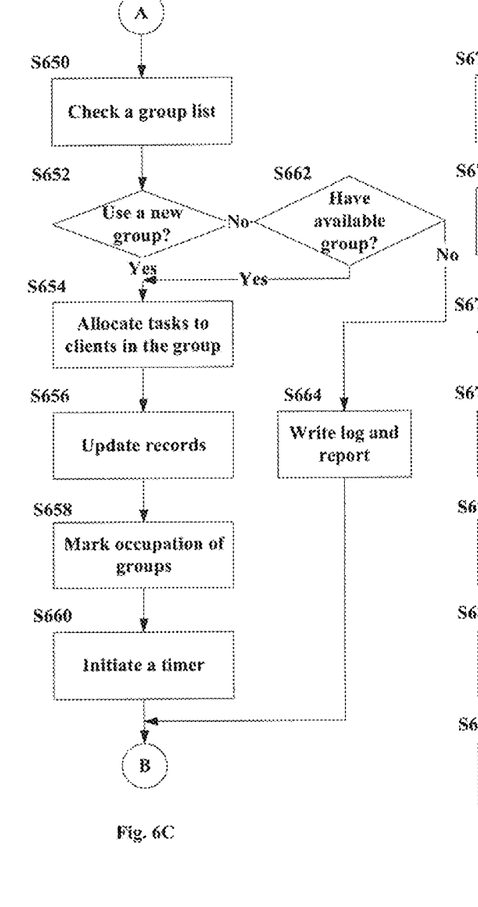
FIG. 6C illustrates a processing flow of requesting to offload a job.

As illustrated in FIG. 6C, this figure illustrates details of the processing flow S536 of task processing as illustrated in FIG. 5B. It should be noted that the operation for the task processing event is a significant operation flow according to one embodiment of the present invention, and a main process of the flow controlling the server side to collaboratively leverage the processing capacity of the client.

Figure 6D:
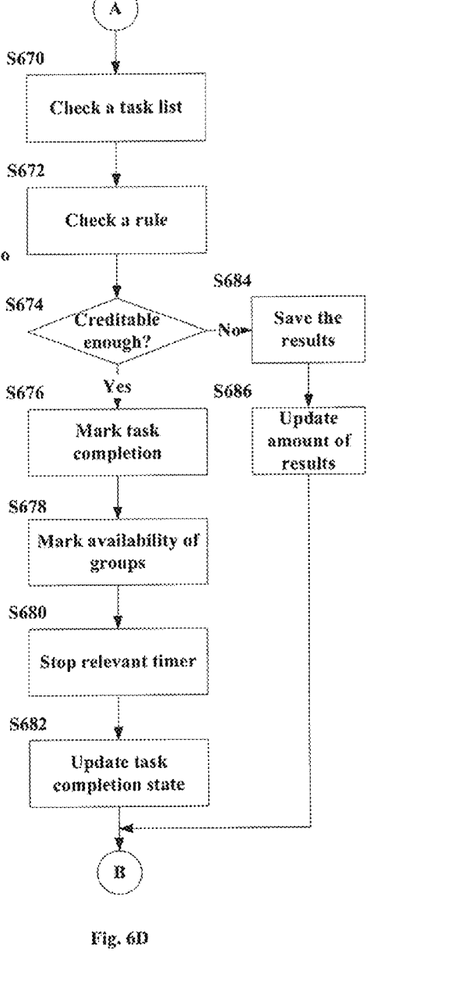
FIG. 6D illustrates a processing flow of task processing.

During this round of operation, responsive to occurrence of the event of task processing, at step S650, a list of client groups is checked, and at step S652, whether to use a new client group is determined; if the determination is "Yes," then the processing flow proceeds to step S654 so as to allocate tasks to clients in the group; if the determination at step S652 is "No," then the flow proceeds to step S662 to determine whether an available packet exists. If it is determined that no groups are available at step S662, then the flow proceeds to step S604 to take down a log and to report that there no currently available groups to an event scheduler of the server side. After step S654, records are updated at step S656, occupation of the client group is marked at step S658, and at step S660, a timer for the task that is being processed is initiated. At this point, processing for the task processing event ends. It should be noted that the timer at step S660 is just the timer as depicted in step S680 of FIG. 6D. Step S660 of the task processing flow of FIG. 6C is the start point for initiating the timer, while step S680 of the task result returning flow of FIG. 6D is the end point for the timer to stop. Although the start and end steps are performed in different event processing flows, as far as the same task is concerned, the two operations are to set the same timer so as to indicate whether the client group has completed processing on the task and returned the result to the server within a prescribed time, and in the case of failing to complete the task within the prescribed time, corresponding timeout operation is called as illustrated in event S540 in FIG. 5B.

As illustrated in FIG. 6D, this figure illustrates details of the processing flow S538 of returning a task result as illustrated in FIG. 5B. In this round of operation, responsive to occurrence of an event that a new client logon, at step S670, a task list is checked, where the task list may maintain information on tasks into which the job is partitioned, for example, a correspondence relationship between the task and the job, current state of the task (for example, not allocated yet, allocated, and completed), and a correspondence relationship between the task client group and a client in the client group. At step S672, a rule associated with returning a task result is queried, and at step S674, whether it is creditable enough is determined, for example, the confidence degree of the result may be determined by the method of consistency standard as described above, or other method.

When the determining result at step S674 is "No" (namely, not creditable), the flow proceeds to step S684 to save the results, and then at step S686, the amount of results is updated, and then the processing for this event ends; if the determining result at step S674 is "Yes," namely creditable, then the flow proceeds to step S676 to mark task completion, and at step 678, it is marked that the client group is available, and then at step S680, relevant timer is stopped. It should be noted that the timer here is for determining whether a task execution is timeout, where when the timer is timeout and the processing result has not been figured out yet, the timeout event as indicated by S540 in FIG. 5B is generated. After step S680, task completion state is updated at step S682, when the processing for returning a task result ends, and the flow enters into a state of waiting for other events.

Figure 7:
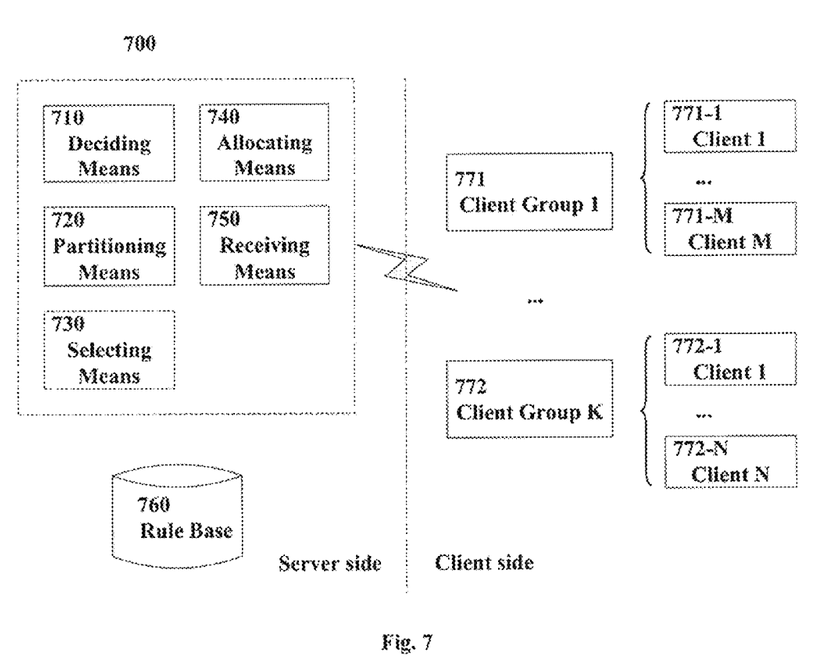
FIG. 7 schematically illustrates a block diagram of an apparatus for extending or allocating processing capacity of a server side according to one embodiment of the present invention.

Now referring to FIG. 7, it schematically illustrates a block diagram 700 of an apparatus for extending or allocating processing capacity of a server side according to one embodiment of the present invention. As indicated by the left dotted-line block of FIG. 7, the apparatus for extending processing capacity of a server side comprises: deciding means 710 for deciding a job to be offloaded from the server side; partitioning means for partitioning the job into one or more tasks; allocating means 740 for allocating the one or more tasks to one or more clients in response to http requests transmitted from the one or more clients; and receiving means 750 for receiving, from the http request transmitted from the one or more clients, responses to the one or more tasks from the one or more clients.

An apparatus according to one embodiment of the present invention may further comprise: selecting means 730 for selecting one or more clients at the server side to execute one or more tasks.

An apparatus according to one embodiment of the present invention may further comprise a rule base 760 for storing various kinds of rules relating to determinations as to whether it is necessary to offload a job from the server side, to partition the job into tasks, to allocate tasks to clients, to generate a processing result of at least one part of the job based on responses from the clients, and to classify the clients into groups. It should be noted that although the rule base 760 as illustrated in FIG. 7 is at the server side, in practice the rule base 760 may be located in any data storage means outside the server side, as long as the apparatus according to the present invention may access the rule base 760 and obtain a rule.

As indicated by the right side dotted line in FIG. 7, it illustrates the client group and corresponding clients which may be used by the server side for sharing its own load. For example, the client group 1 may comprise M clients, while the client group K may comprise N clients.

When the apparatus of FIG. 7 runs, for the job to be offloaded as decided by the deciding means 710, the partitioning means 720 partitions it into one or more tasks. Afterwards, the allocating means 740 may allocate the tasks obtained from the partitioning by the partitioning means 720 to the corresponding client groups as illustrated in the right side of the dotted line, respectively, and the receiving means 750 receives responses generated from respective client groups and may further generate a processing result for at least one part of job. During the operation process, respective means may further read rules from the rule base 760 to control their own operations.

According to one embodiment of the present invention, the deciding means 710 comprises: determining means for determining a current load level at the server side; and appointing means for appointing the job to be offloaded from the server side in response to a determination that the current load level will or already exceeds a threshold load level.

According to one embodiment of the present invention, the allocating means 740 comprises grouping means for grouping the one or more clients based on attributes of the one or more clients; and assigning means for assigning, with a unit of group, a task that matches the group to the one or more clients.

According to one embodiment of the present invention, attributes of the clients comprise one or more items of: processing capacity of the clients, current loads of the clients, response time of the clients, confidence degree of the clients, routing condition from the clients to the server side, history of task completion of the clients, and agreements between the clients and the server side, etc.

According to one embodiment of the present invention, the allocating means 740 comprises: sending means for sending task descriptions and to-be-processed data corresponding to one or more tasks to one more clients, responsive to one or more clients logging onto the server side.

According to one embodiment of the present invention, the task description comprises one or more of: an input data description, an output data description, and a processing algorithm or the description thereof.

According to one embodiment of the present invention, the partitioning means 720 is operated based on a predetermined rule which relates to at least one of: granularity of the task, computational load of the job, priority of the job, confidentiality of the job, and granularity of the task, etc.

According to one embodiment of the present invention, the granularity of the task may be dynamically set based on experience of a client in previous task execution.

According to one embodiment of the present invention, the apparatus for extending processing capacity of a server side further comprises: generating means for generating a processing result of at least one part of the job based on responses of one or more clients to one or more tasks.

According to one embodiment of the present invention, generating means further comprises: obtaining means for obtaining confidence degree of responses from one or more clients; and providing means for providing a processing result of at least one part of the job based on the confidence degree.

It should be noted that although various means in the apparatus for extending processing capacity of the server side have not been illustrated in details one by one in the figures, those skilled in the art may implement the respective means based on the disclosure of the specification. Besides, respective means as illustrated in FIG. 7 and others not enumerated in FIG. 7 may be located in one or more servers at the server side or in one or more other dedicated devices. The embodiments of the present invention do not limit the physical location of the apparatus for extending the processing capacity of the server side, and respective means as comprised in this apparatus may be collectively or distributively located in any suitable physical device, as long as these means can implement the functions as recited in this description as a whole.

As mentioned above, a method and apparatus for extending or allocating the processing capacity of the server side according to the embodiments of the present invention have been illustrated with reference to FIGS. 1 to 7. However, it should be noted that the examples as posed with the shopping website as an example in the specification are only exemplary, and the manner of website records log as specified in the examples are also only for schematic purposes, intended to explain the operating principle of the embodiments of the present invention through schematic examples. Based on differences in setting the server side and clients, it may be implemented with any other manner without departing from the principle of the present invention. According to one embodiment of the present invention, the MapReduce architecture may be employed in the method for extending or allocating the processing capacity of the server side.

The present invention may adopt a form of hardware embodiment, software embodiment or one embodiment comprising hardware components and software components. In a preferred embodiment, the present invention is implemented as software, including, without limitation to, firmware, resident software, micro-code, etc.

Moreover, the present invention may be implemented as a computer program product usable from computers or accessible by computer-readable media that provide program code for use by or in connection with a computer or any instruction executing system. For the purpose of description, a computer-usable or computer-readable medium may be any tangible means that can contain, store, communicate, propagate, or transport the program for use by or in connection with an instruction execution system, apparatus, or device.

The medium may be an electric, magnetic, optical, electromagnetic, infrared, or semiconductor system (apparatus or device), or propagation medium. Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system adapted for storing or executing program code would include at least one processor that is coupled to a memory element directly or via a system bus. The memory element may include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) may be coupled to the system directly or via an intermediate I/O controller.

A network adapter may also be coupled to the system such that the data processing system can be coupled to other data processing systems, remote printers or storage devices via an intermediate private or public network. A modem, a cable modem, and an Ethernet card are merely examples of a currently usable network adapter.

It is to be understood from the foregoing description that modifications and alterations may be made to the respective embodiments of the present invention without departing from the true spirit of the present invention. The description in the present specification is intended to be illustrative and not limiting. The scope of the present invention is limited by the appended claims only.

The invention claimed is:

1. A method of extending processing capacity of a server side, comprising:
    deciding a job to be offloaded from the server side, wherein the deciding a job to be offloaded from the server side comprises determining a current load level of the server side and appointing a job to be offloaded from the server side, in response to deciding that the current load level is to exceed or already exceeds a threshold load level;
    allocating two or more tasks to one or more clients based on attributes of the one or more clients wherein attributes of the clients include the response time of the clients, confidence degree of the clients, routing condition from the clients to the server side;
    allocating the two or more tasks to one or more clients in response to http requests transmitted from the one or more clients; and
    receiving, from the http requests transmitted from the one or more clients, responses of the one or more clients to the two or more tasks.

2. The method according to claim 1, further comprising: selecting the one or more clients for executing the two or more tasks.

3. The method according to claim 1, wherein allocating the two or more tasks to the one or more clients comprises:
    transmitting to the one or more clients task description and to-be-processed data corresponding to the two or more tasks, in response to the one or more clients logging onto the server side.

4. The method according to claim 3, wherein the task description comprises one or more of: an input data description, an output data description, and a processing algorithm or its description.

5. The method according to claim 1, wherein partitioning the job into two or more tasks is performed based on a predetermined rule relating to at least one of: computational load of the job, priority level of the job, confidentiality of the job, and task granularity.

6. The method according to claim 5, wherein the task granularity is dynamically set based on client experience in executing previous tasks.

7. The method according to claim 1, further comprising: generating a processing result of at least one part of the job based on responses of the one or more clients to the two or more tasks.

8. The method according to claim 7, wherein the generating a processing result of at least one part of the job further comprises:
   obtaining confidence degree of responses from the one or more clients; and
   providing a processing result of at least one part of the job based on the confidence degree.

9. An apparatus for extending processing capacity of a server side, comprising:
   deciding means configured for deciding a job to be offloaded from the server side by determining a current load level of the server side and appointing a job to be offloaded from the server side, in response to deciding that the current load level is to exceed or already exceeds a threshold load level;
   partitioning means configured for partitioning the job into two or more tasks, wherein at least two of the two or more tasks have different granularities;
   allocating means configured for allocating the two or more tasks to one or more clients in response to http requests transmitted from the one or more clients, the allocating based on attributes of the one or more clients wherein attributes of the clients include the response time of the clients, confidence degree of the clients, routing condition from the clients to the server side; and
   receiving means configured for receiving, from the http requests transmitted from the one or more clients, responses of the one or more clients to the two or more tasks.

10. The apparatus according to claim 9, further comprising: selecting means configured for selecting the one or more clients for executing the two or more tasks.

11. The apparatus according to claim 9, wherein the allocating means comprises:
    transmitting means configured for transmitting to the one or more clients task description and to-be-processed data corresponding to the two or more tasks, in response to the one or more clients logging onto the server side.

12. The apparatus according to claim 11, wherein the task description comprises one or more of: input data description, output data description, and processing algorithm or its description.

13. The apparatus according to claim 9 to, wherein the partitioning means is operated based on a predetermined rule relating to at least one of: computational load of the job, priority level of the job, confidentiality of the job, and task granularity.

14. The apparatus according to claim 13, wherein the task granularity may be dynamically set based on client experience in executing previous tasks.

15. The apparatus according to claim 9, further comprising: generating means configured for generating a processing result of at least one part of the job based on responses of the one or more clients to the two or more tasks.

16. The apparatus according to claim 15, wherein the generating means further comprises:
    obtaining means configured for obtaining confidence degree of responses from the one or more clients; and
    providing means configured for providing a processing result of at least one part of the job based on the confidence degree.

* * * * *